United States Patent
Nakaike et al.

(10) Patent No.: US 8,181,169 B2
(45) Date of Patent: May 15, 2012

(54) MEASURING EXECUTION TIME FOR PROGRAM OPTIMIZATION

(75) Inventors: Takuya Nakaike, Yokohama (JP); Hideaki Komacou, Yokohama (JP); Soiichi Kawano, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 977 days.

(21) Appl. No.: 12/170,990

(22) Filed: Jul. 10, 2008

(65) Prior Publication Data

US 2009/0077351 A1 Mar. 19, 2009

(51) Int. Cl.
*G06F 9/45* (2006.01)
(52) U.S. Cl. ....................................................... 717/151
(58) Field of Classification Search .................... 717/151
See application file for complete search history.

(56) References Cited

U.S. PATENT DOCUMENTS

2005/0044538 A1* 2/2005 Mantripragada ............. 717/151

OTHER PUBLICATIONS

Ana Azevedo et al., "Profile-based Dynamic Voltage Scheduling using Program Checkpoints", 2002, Design, Automation and Test in Europe Conference and Exhibition, 2002. Proceedings, pp. 168-175.*

* cited by examiner

*Primary Examiner* — Ted T Vo
*Assistant Examiner* — Lanny Ung
(74) *Attorney, Agent, or Firm* — Michael J. Buchenhorner; Vazken Alexanian

(57) ABSTRACT

Devices, compilers and methods to reduce energy consumption associated with execution of a program by adjusting a computational capability of a CPU with higher accuracy than before. A device sets an appropriate computational capability to the CPU. It includes: changing a computational capability of the CPU every time each of a plurality of program areas included in the execution program is executed while the execution program is being executed, and measuring execution time each of the program areas; deciding an optimal computational capability required to execute the program area using the CPU, based on the execution time for each of the computational capabilities measured for the respective program areas; and performing setting of the optimal computational capability for executing the program area, which is to be used when executing the program area again in the course of executing the execution program, for each of the program areas.

18 Claims, 12 Drawing Sheets

1025

| Operating Frequency (GHz) | Voltage (V) | Power Consumption (Watts) |
|---|---|---|
| 1.6 | 1.484 | 24.5 |
| 1.4 | 1.484 | 22.0 |
| 1.2 | 1.39 | 12.0 |
| 1.0 | 1.39 | 7.0 |
| 0.8 | 1.036 | 6.5 |
| 0.6 | 0.956 | 6.0 |

FIG. 2

```
1:  void foo () {
2:      StartProfile (profileInfo1); /* Start Profiling Entire Method */
3:
4:
5:      StartProfile (profileInfo2); /* Start Profiling Loop 1 */
6:      for (...) { /* Loop 1 */
7:          StartProfile (profileInfo3); /* Start Profiling Loop 2 */
8:          for (...) { /* Loop 2 */
9:
10:             SuspendProfile (profileInfo[]) ; /* Suspend Profiling */
11:             fool ();
12:             ResumeProfile (profileInfo[]) ; /* Resume Profiling */
13:
14:         }
15:         EndProfile (profileInfo3) ; /*End Profiling Loop 2*/
16:     }
17:     EndProfile (profileInfo2) ; /*End Profiling Loop 1*/
18:
19:
20:     EndProfile (profileInfo1) ; /* End Profiling Entire Method */
21: }
```

305-1, 305-2, 305-3

Operating Frequency Shift Command

Operating Frequency Shift Command

FIG. 5

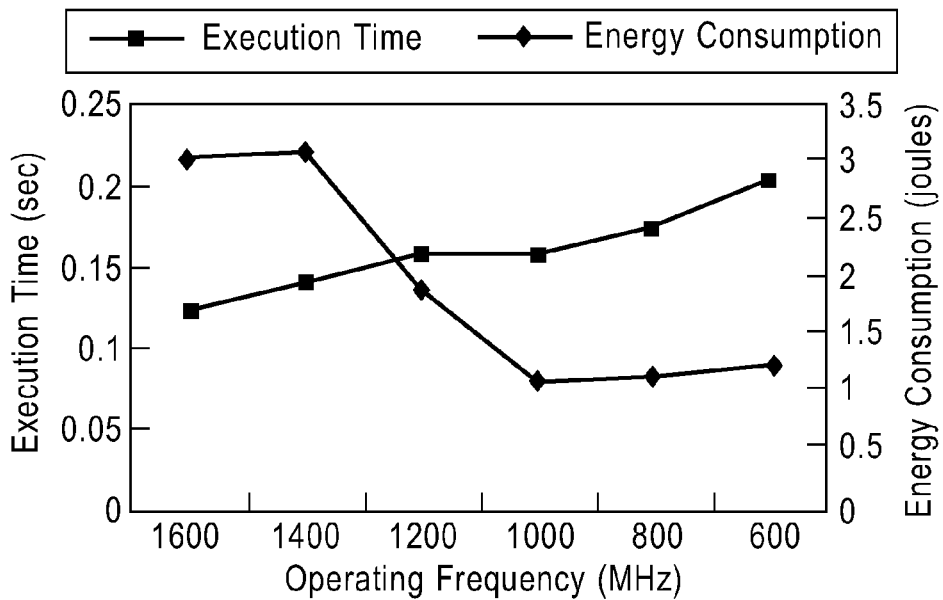

FIG. 10

| Priority Of Thread B(y) | Priority Of Thread B(y) | How To Allocate Processor Resources |
|---|---|---|
| 1 | >1 | All execution resources are allocated to thread B. Thread B Possesses performance equivalent to single thread mode. However, context of thread A is saved. |
| 1 | 1 | Only 1 slot out of 32 decoding slots is allocated to thread. |
| >1 | >1 | Decoding slots are allocated to lower priority thread and remaining slots are allocated to higher priority thread. |
| 0 | 1 | 1 slot out of 32 decoding slots is allocated to thread B. |
| 0 | >1 | All decoding slots are allocated to thread B. |
| 0 | 0 | Both threads are stopped. |

FIG. 11

MEASURING EXECUTION TIME FOR PROGRAM OPTIMIZATION

FIELD OF THE INVENTION

The present invention relates to an information processing device, a compiler, and a compiler program. More specifically, the present invention relates to information processing devices and compilers, which are configured to perform optimization based on a result of measuring execution time obtained for execution of a program.

BACKGROUND OF THE INVENTION

The simultaneous multi-threading (SMT) technique adopted in a Power5 (registered trademark) processor made by IBM Corporation causes a single processor to execute two threads simultaneously, provides the threads in execution with priorities, and thereby enables variation of a proportion of processor resources used by the threads which are simultaneously executed (see R. Kalla, B. Sinharoy, and J. Tendler, "Simultaneous Multi-threading Implementation in POWER5—IBM's Next Generation POWER Microprocessor," A symposium on High Performance Chips, with URL: http://www.
followed by: hotchips.org/
followed by: archive/hc15/pdf/
followed by: 11.ibm.pdf)
(hereinafter referred to as "Non-patent Literature 5"). In other words, two logical processors existing on a single actual processor changes computational capabilities thereof depending on the priorities of the threads to be executed. Therefore, in the Power5 processor, it is essential to balance the computational capabilities of the two logical processors existing on the single actual processor and thereby to achieve a high execution performance.

For example, in order to achieve the high execution performance in a program area having high instruction-level parallelism, the processor needs to contain large computational resources. On the contrary, in a program area having low instruction-level parallelism, even a processor containing small computational resources can achieve sufficient performances. Meanwhile, a Pentium (registered trademark) M processor is configured to change the computational capability thereof by shifting an operating frequency instead of using the thread priorities (see "Intel® Pentium® M Processor Datasheet," Document Number: 252612-003, April 2004) (hereinafter referred to as "Non-patent Literature 3"). For example, in a program area where cache misses occur frequently and the processor becomes idle frequently, an increase in execution time is very limited even when the operating frequency is reduced. Accordingly, it is possible to reduce energy consumption in a large amount.

The above-described processor, which is able to change the computational capabilities, can reduce the energy consumption without sacrificing execution speed by means of analyzing characteristics of program codes and extracting a program area in which the increase in execution time is not caused while the computational capabilities is reduced. For example, there has been proposed a technique using a processor configured to shift the operating frequency dynamically, in which execution time for each program area is measured, while an operating frequency is shifted, to obtain the operating frequency which can suppress a proportion of increases in the execution time for respective program areas below a threshold (see C. H. Hsu and U. Kremer, "The Design, Implementation, and Evaluation of a Compiler Algorithm for CPU Energy Reduction," PLDI, 2003)(hereinafter referred to as "Non-patent Literature 1").

However, in the technique disclosed in Non-patent Literature 1, measurement of the execution time is carried out by profiling (offline profiling) test execution using test data. That is, the computational capabilities given to the respective program areas are not changed during the program is actually in execution instead of during the test execution. For this reason, when characteristics of input data vary in the course of executing the program, it is not possible to adjust a computational capability of a central processing unit so as to follow such variation.

Moreover, the above-described threshold is a constant. Accordingly, if the computational capability is reduced based on this threshold, there is a risk of an increase in the energy consumption as a consequence. For example, when power consumption (Watts) is reduced from $W_i$ to $W_{i-1}$ due to reduction in the computational capability and the execution time is increased from $T_i$ to $T_{i-1}$, the energy consumption (Joule) is changed from $W_i \times T_i$ to $W_{i-1} \times T_{i-1}$. However, in the case where the increase in the execution time is great relative to reduction in the power consumption even if a proportion of increase in the execution time is equal to or smaller than the above-described threshold, $W_i \times T_i$ may become smaller than $W_{i-1} \times T_{i-1}$ and the energy consumption may therefore be increased.

SUMMARY OF THE INVENTION

Accordingly, it is an aspect of the present invention to provide devices, compilers, and a compiler program which can solve the above-described problems.

Thus, the present invention provides an information processing device for setting a computational capability to a central processing unit, the capability determined based on an execution program to be executed by the central processing unit, of which computational capability is rendered variable in the course of execution.

In an example embodiment, the information processing device includes: an execution time measurement unit for changing a computational capability of the central processing unit every time each of a plurality of program areas included in the execution program is executed while the execution program is being executed and for measuring the execution time for each of the plurality of program areas; an optimal computational capability decision unit for deciding an optimal computational capability, which is equivalent to a computational capability required to execute the program area using the central processing unit, based on the execution time for each of the computational capabilities measured for the respective program areas; and a computational capability setting unit for performing setting of the optimal computational capability for executing the program area, which is to be used when executing the program area again in the course of executing the execution program, for each of the program areas.

The present invention also provides a compiler to be operated by the information processing device and a compiler program to cause the information processing device to function as the compiler. According to the present invention, a computational capability of a central processing unit can be adjusted with higher accuracy than before, thereby reducing energy consumption relevant to execution of a program.

BRIEF DESCRIPTION OF THE DRAWINGS

For a more complete understanding of the present invention and the advantages thereof, reference is now made to the following description taken in conjunction with the accompanying drawings.

FIG. 2 shows an example of a data structure of a power consumption information storage unit 1025.

FIG. 5 shows a concrete example of program areas 305-1 to 305-3.

FIG. 10 shows an execution result when the compiler 40 compiled and executed a benchmark program.

FIG. 11 is a view for explaining functions of the central processing unit 1000 according to a modified example of the embodiment.

DETAILED DESCRIPTION OF THE INVENTION

The present invention provides information processing devices, compilers, and compiler programs which solve the above-described problems. A first embodiment of the present invention provides an information processing device for setting a computational capability to a central processing unit. The capability is determined based on an execution program to be executed by the central processing unit, of which computational capability is rendered variable in the course of execution.

In an embodiment, the information processing device includes: an execution time measurement unit for changing a computational capability of the central processing unit every time each of a plurality of program areas included in the execution program is executed while the execution program is being executed, and for measuring the execution time for each of the plurality of program areas; an optimal computational capability decision unit for deciding an optimal computational capability, which is equivalent to a computational capability required to execute the program area using the central processing unit, based on the execution time for each of the computational capabilities measured for the respective program areas; and a computational capability setting unit for performing setting of the optimal computational capability for executing the program area, which is to be used when executing the program area again in the course of executing the execution program, for each of the program areas.

The present invention also provides a compiler to be operated by the information processing device and a compiler program to cause the information processing device to function as the compiler. It should be noted that the above-described outlines of the invention do not enumerate all the necessary features of the present invention, and that subcombinations of these groups of features may also constitute the present invention. Thus, in accordance with the present invention, a computational capability of a central processing unit can be adjusted with higher accuracy than before, so as to reducing energy consumption relevant to execution of a program.

Now, the present invention is described with reference to advantageous embodiments. It is to be understood, however, that the embodiments described below do not limit the scope of the invention to be defined in the appended claims, and that all the combinations of features described in the embodiment are not always essential as the solution to be provided by the invention.

Figure 1:
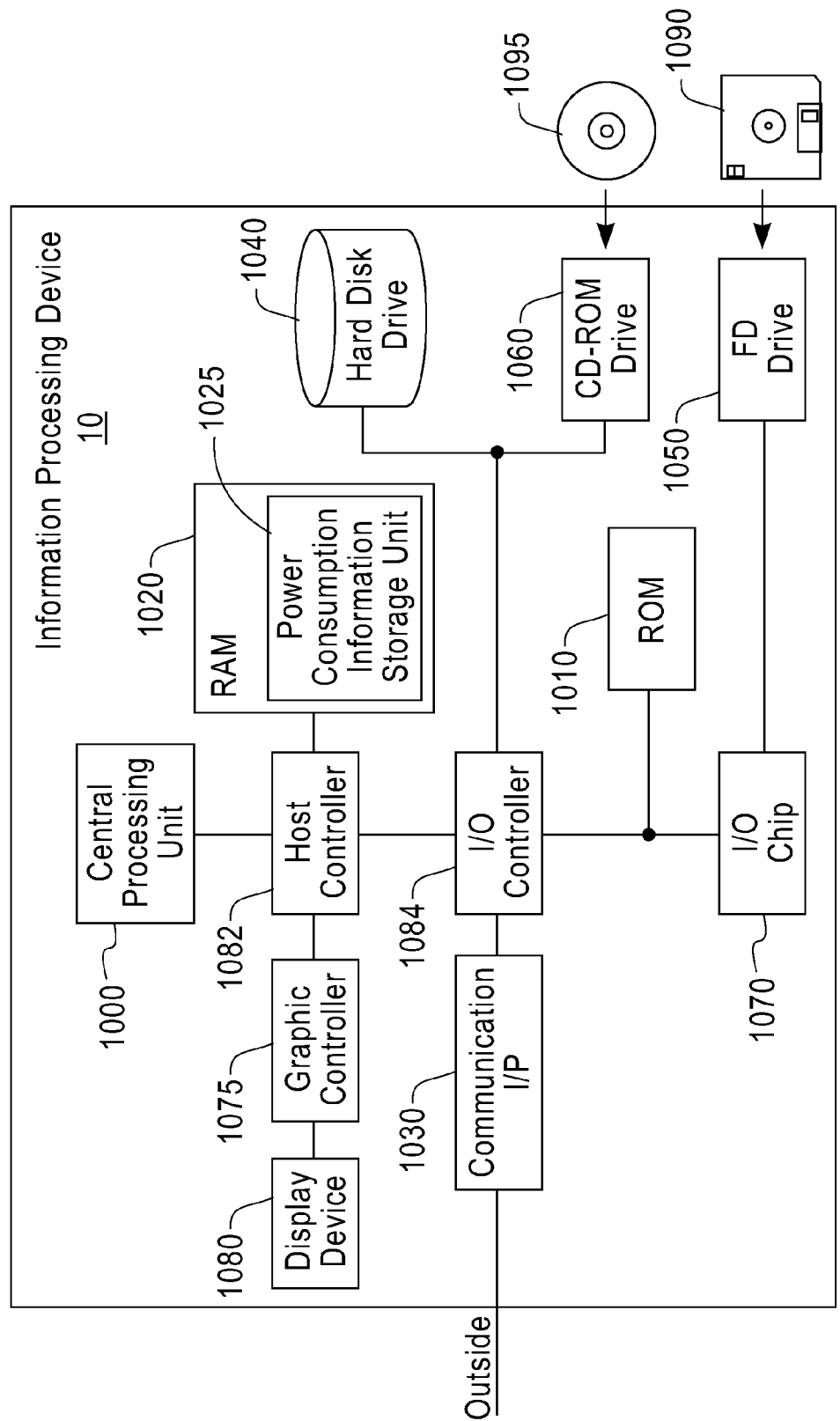
FIG. 1 shows a configuration of an information processing device 10.

FIG. 1 shows a configuration of an information processing device 10. The information processing device 10 includes a CPU peripheral unit including a central processing unit 1000, a RAM 1020, and a graphic controller 1075 which are connected to one another through a host controller 1082. Moreover, the information processing device 10 includes an input and output unit including a communication interface 1030, a hard disk drive 1040, and a CD-ROM drive 1060 which are connected to the host controller 1082 through an input and output controller 1084.

Meanwhile, the information processing device 10 includes a legacy input and output unit including a ROM 1010, a flexible disk drive 1050, and an input and output chip 1070 which are connected to the input and output controller 1084. The host controller 1082 connects the RAM 1020 to the central processing unit 1000 and to the graphic controller 1075 which access the RAM 1020 at a high transfer rate. The central processing unit 1000 is operated based on programs stored in the ROM 1010 and in the RAM 1020 to control the respective units. Moreover, the central processing unit 1000 can change a computational capability such as an operating frequency in the course of execution.

The RAM 1020 stores various data to be read out by the central processing unit 1000. For example, the RAM 1020 includes a power consumption information storage unit 1025 for storing sizes of voltages and power consumption for the central processing unit 1000 for each operating frequency set up in the central processing unit 1000 so as to meet the cases where the respective operating frequencies are set to the central processing unit 1000. The graphic controller 1075 acquires image data to be generated on a frame buffer provided in the RAM 1020 by the central processing unit 1000 and the like, and displays the image data on a display device 1080. Instead, the graphic controller 1075 may incorporate the frame buffer for storing the image data to be generated by the central processing unit 1000 and the like.

The input and output controller 1084 connects the host controller 1082 to the communication interface 1030, to the hard disk drive 1040, and to the CD-ROM drive 1060 which are relatively high-speed input and output devices. The communication interface 1030 communicates with external devices through a network. The hard disk drive 1040 stores programs and data to be used by the information processing device 10. The CD-ROM drive 1060 reads programs or data out of a CD-ROM 1095 and transfers the programs or data to the input and output chip 1070 through the RAM 1020.

Meanwhile, the ROM 1010 and relatively low-speed input and output devices including the flexible disk drive 1050, the input and output chip 1070, and the like are connected to the input and output controller 1084. The ROM 1010 stores a boot program to be executed by the central processing unit 1000 when starting the information processing device 10, programs dependent on the hardware of the information processing device 10, and the like. The flexible disk drive 1050 reads programs or data out of a flexible disk 1090, and transfers the programs or data to the input and output chip 1070 through the RAM 1020. The input and output chip 1070 connects the flexible disk 1090, and various input and output devices through a parallel port, a serial port, a keyboard port, a mouse port, and the like.

A program to be provided to the information processing device 10 is contained in a recording medium such as the flexible disk 1090, the CD-ROM 1095, or an IC card, which is offered by a user. The program is read out of the recording medium through the input and output chip 1070 and/or the input and output controller 1084, and is installed in the information processing device 10 for execution. The program to be installed in the information processing device 10 is typically a compiler program which causes the information processing device 10 to function as a compiler. Operations which the compiler program causes the information processing device 10 and the like to execute will be described later with reference to FIG. 2 to FIG. 13.

The above-described programs may be stored in an external recording medium. As for the recording medium, an optical recording medium such as a DVD or a PD, a magneto-optical recording medium such as an MD, a tape medium, a semiconductor medium such as an IC card, and the like are applicable in addition to the flexible disk 1090 and the CD-ROM 1095. It is also possible to use a storage device such as a hard disk or a RAM, which is provided in a server system connected to an exclusive communication network or the Internet, as the recording medium so as to transfer the program to the information processing device 10 through a network.

FIG. 2 shows an example of a data structure of the power consumption information storage unit 1025. The power consumption information storage unit 1025 stores the sizes of voltages and power consumption for the central processing unit 1000 for each operating frequency set up in the central processing unit 1000 so as to meet the cases where the respective operating frequencies are set to the central processing unit 1000. For example, this figure shows the voltages and the power consumption for the operating frequencies on the premise that the central processing unit 1000 is a Pentium M processor made by Intel Corporation and that the operating frequency is switched by use of the SpeedStep technology.

To be more precise, when the central processing unit 1000 is operated at 1.6 GHz, the power consumption is equal to 24.5 Watts. Meanwhile, when the central processing unit 1000 is operated at 1.4 GHz, the power consumption is equal to 22.0 Watts. In this way, in the case of the central processing unit 1000, the power consumption is increased when the operating frequency is raised, and is decreased when the operating frequency is dropped.

Moreover, the central processing unit 1000 can dynamically shift the operating frequency in the course of execution by the central processing unit 1000. Here, Intel Corporation, Pentium M, and SpeedStep are registered trademarks. Details of these techniques are disclosed in Non-patent Literature 3. Accordingly, explanations thereof will be omitted in this embodiment.

Figure 3:
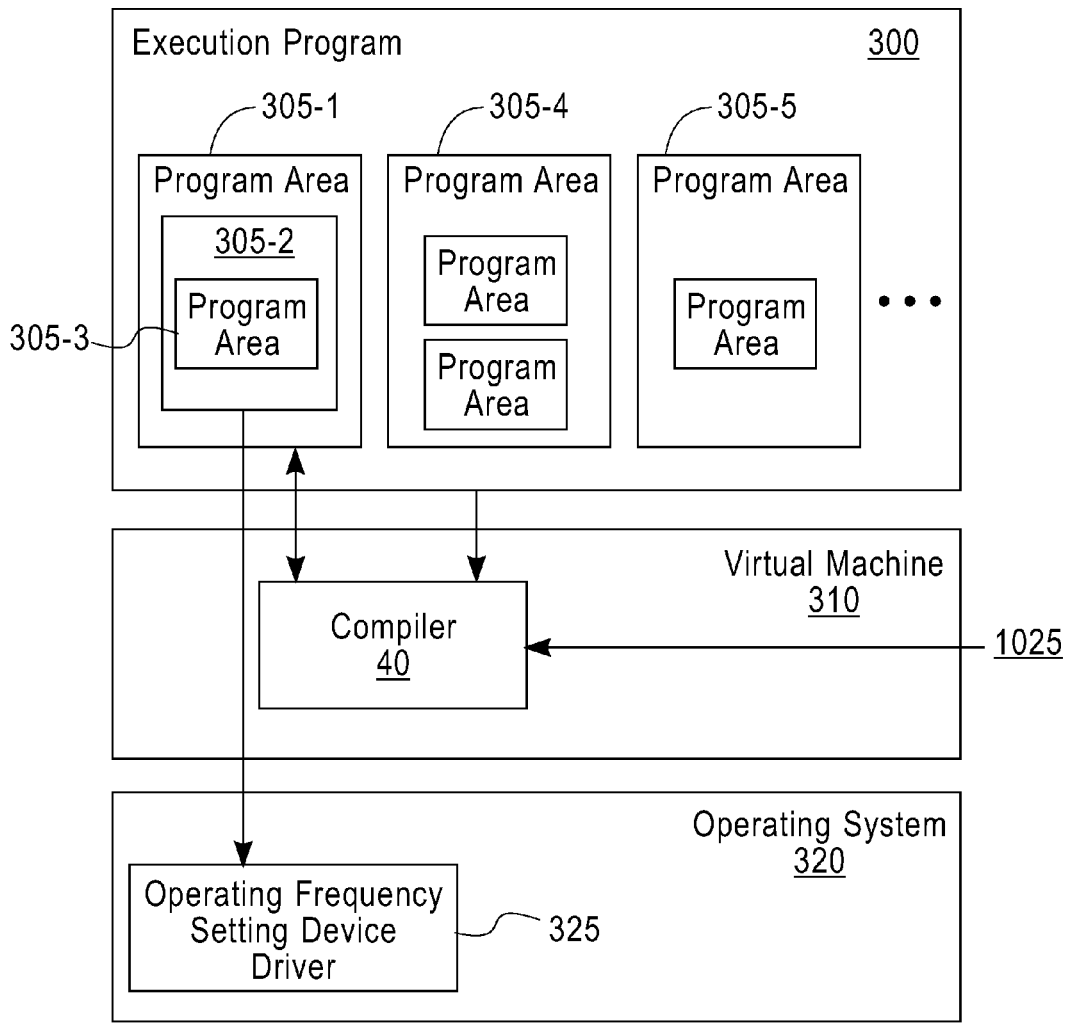
FIG. 3 shows a configuration of a program to be executed by a central processing unit 1000.

FIG. 3 shows a configuration of a program to be executed by the central processing unit 1000. The central processing unit 1000 functions as a virtual machine 310 and as an operating system 320. Moreover, the virtual machine 310 cooperates with the operating system 320 to execute an execution program 300 written in Java (registered trademark) and the like. The execution program 300 includes a program area 305-1, a program area 305-4, and a program area 305-5. The program area 305-1 includes a program area 305-2, and the program area 305-2 further includes a program area 305-3.

The virtual machine 310 includes a compiler 40. The compiler 40 compiles part of the execution program 300 as appropriate when the virtual machine 310 is executing the execution program 300 by use of an interpreter function. Moreover, in this case, the central processing unit 1000 executes a program derived as a compilation result, replacing the execution made by use of the interpreter function. For example, the compiler 40 may perform optimization in the course of compilation so as to generate a command for shifting the operating frequency in the program area 305-1. In this case, the command is executed while the program area 305-1 is executed. As a result, an operating frequency setting device driver 325 is called from the program area 305-1, and the operating frequency is shifted.

Figure 4:
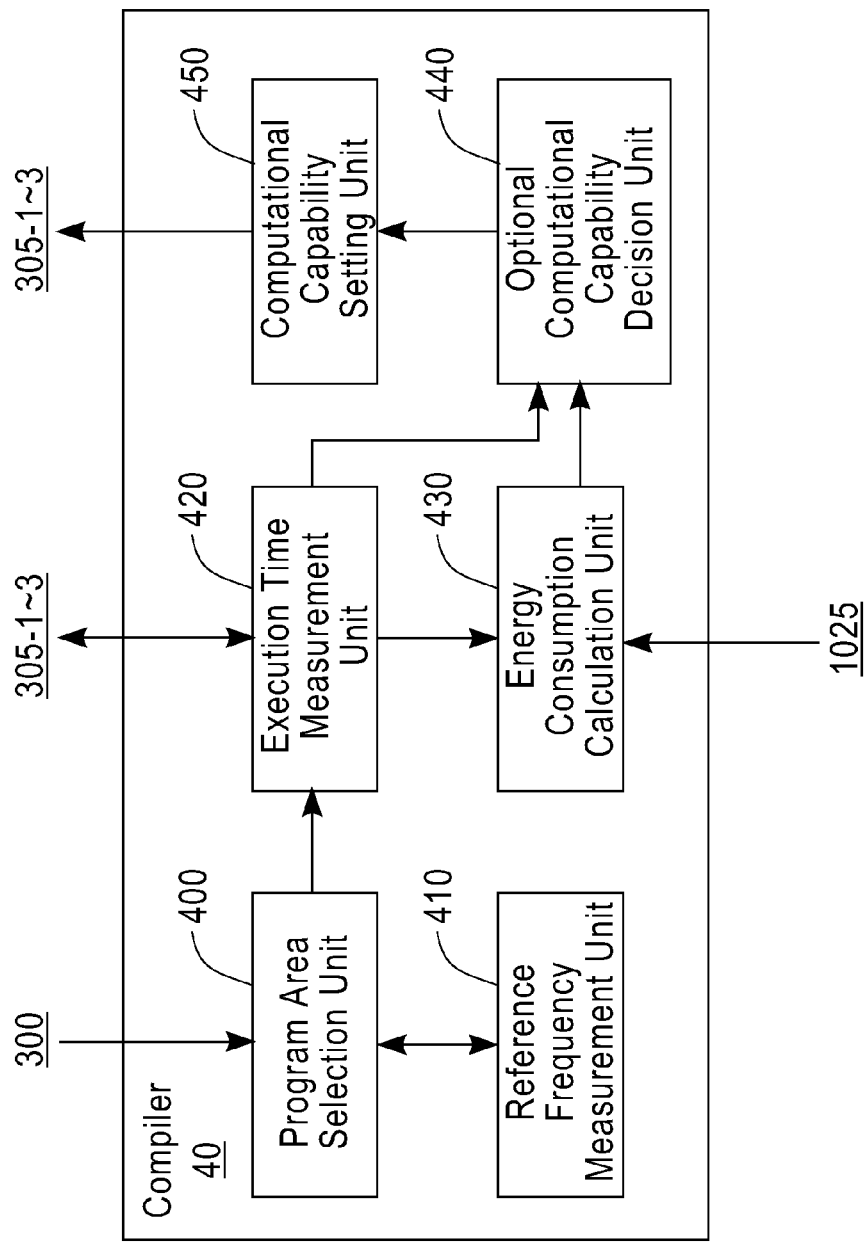
FIG. 4 shows functions of a compiler 40 which are categorized by functional blocks.

FIG. 4 shows functions of the compiler 40 which are categorized by functional blocks. The compiler 40 includes a program area selection unit 400, a reference frequency measurement unit 410, an execution time measurement unit 420, an energy consumption calculation unit 430, an optimal computational capability decision unit 440, and a computational capability setting unit 450. The program area selection unit 400 selects a program area out of the program areas 305-1 to 305-5 included in the execution program 300, which program area being executed at a frequency equal to or above a predetermined standard execution frequency. For example, the reference frequency measurement unit 410 makes reference to an address value of a program counter in the central processing unit 1000 at a predetermined time interval.

Moreover, the program area selection unit 400 judges for each of the program areas 305-1 to 305-5 as to whether or not the frequency of reference to the address value included in the program area by the reference frequency measurement unit 410 is equal to the standard execution frequency. Then, the program area selection unit 400 selects the program area having a frequency equal to or above the standard execution frequency. As a result, the program areas 305-1 to 305-3 are selected, for example.

Here, for example, the program area is any of a method included in the execution program 300, an outer loop area included in the method, an inner loop area included in the outer loop area, and the like, for example. Moreover, the program area selection unit 400 may acquire information in advance indicating that the method, the outer loop area, and the inner loop area are located in the region from which address to which address in the execution program 300 while linking such information with the execution program 300.

For example, when the compiler 40 is a Java (registered trademark) Just-In-Time compiler, the program region selection unit 400 can acquire this information at compile time from Java bytecodes. On the contrary, if it is not possible to acquire this information, the program area selection unit 400 may determine boundaries of the respective program areas by analyzing a control flow in the execution program 300.

The execution time measurement unit 420 measures execution time for each of the program areas 305-1 to 305-3 selected by the program area selection unit 400 by shifting the operating frequency of the central processing unit 1000 every time the relevant program area is executed in the course of executing the execution program 300. The energy consumption calculation unit 430 calculates energy consumption for each of the program areas 305-1 to 305-3 in the case of executing the relevant program area by use of respective operating frequencies. To be more precise, the energy consumption calculation unit 430 calculates the energy consumption by multiplying the execution time equivalent to time consumed for executing each program area at each operating frequency by the size of the power consumption stored in the power consumption information storage unit 1025 in response to the operating frequency.

The optimal computational capability decision unit 440 decides an optimal operating frequency, which is equivalent to the operating frequency supposed to be used for executing the relevant program area by the central processing unit 1000, based on the execution time for each computational capability measured for each of the program areas 305-1 to 305-3. For example, the optimal computational capability decision unit 440 obtains the operating frequency which minimizes the energy consumption calculated by the energy consumption calculation unit 430 for each of the program areas 305-1 to 305-3, and decides the operating frequency as the optimal operating frequency for the relevant program area.

The computational capability setting unit 450 performs setting for each of the program areas 305-1 to 305-3 in order to execute the relevant program area at the optimal operating frequency thereof when the program area is executed again in the course of executing the execution program 300. To be more precise, the computational capability setting unit 450 may newly generate a command, for each of the program areas 305-1 to 305-3 so as to shift the operating frequency of the central processing unit 1000, in an execution position to be executed prior to the program area when the program area is executed.

In this drawing, the program area selection unit 400, the reference frequency measurement unit 410, the execution time measurement unit 420, the energy consumption calculation unit 430, the optimal computational capability decision unit 440, and the computational capability setting unit 450 are provided inside the compiler 40. Instead, the central processing unit 1000 may include at least part of these constituents as hardware functions. The above-described central processing unit 1000 is also included in the scope of the present invention.

FIG. 5 shows a concrete example of the program areas 305-1 to 305-3. The program area 305-1 is the method shown from line 1 to line 21. Moreover, the program area 305-1 includes the program area 305-2, which is the outer loop shown from line 5 to line 17. Furthermore, the program area 305-2 includes the program area 305-3, which is the inner loop shown from line 7 to line 15.

For each of the program areas 305-1 to 305-3, the execution time measurement unit 420 generates a StartProfile command, which is a command to start measurement of the execution time of the relevant program area, in an execution position to be executed at the beginning when execution of the program area is started. Meanwhile, for each of the program areas 305-1 to 305-3, the execution time measurement unit 420 generates an EndProfile command, which is a command to end the measurement of the execution time of the relevant program area, in an execution position to be executed in the end when the program area is executed.

For example, when the compiler 40 is the Java (registered trademark) Just-In-Time compiler, the execution time measurement unit 420 can insert a command such as StartProfile by using a technique to recompile an already compiled program. Such a technique will be hereinafter referred to as recompilation. Details of recompilation are disclosed in T. Suganuma, T. Yasue, M. Kawahito, H. Komatsu, and T. Nakatani, "A Dynamic Optimization Framework for a Java Just-In-Time Compiler," OOPS LA 2001 (hereinafter referred to as "Non-patent Literature 6"). Accordingly, description thereof will be omitted. On the contrary, even if the compiler 40 is not the Just-In-Time compiler, it is possible to insert a command such as StartProfile by using a technique to dynamically rewrite an already compiled program. Such a technique will be hereinafter referred to as dynamic binary rewriting. Details of dynamic binary rewriting are disclosed in V. Bala, E. Duesterwald, and S. Banerjia, "Dynamo: A Transparent Dynamic Optimization System," PLDI 2000 (hereinafter referred to as "Non-patent Literature 7"). Accordingly, description thereof will be omitted.

When a method foo is called in the course of executing the execution program 300, execution of the program area 305-1 is started. Moreover, when execution of the program area 305-1 is started, a StartProfile command shown on line 2 is executed. Thereafter, when execution of the program area 305-2 is started, a StartProfile command shown on line 5 is executed. Likewise, when execution of the program area 305-3 is started, a StartProfile command shown on line 7 is executed.

The StartProfile command shifts the operating frequency of the central processing unit 1000 every time when executed. Moreover, the StartProfile command reads and saves the number of clock cycles elapsed from a predetermined time point to a time point of execution of the StartProfile command. For example, when the central processing unit 1000 is an Intel IA32 processor, it is possible to read the number of clock cycles by calling an rdtsc (read time stamp counter) command.

Moreover, as for the destination to save the number of clock cycles, it is preferable to apply a variable or an object which is provided in advance for each program area. For example, in this drawing, an object profileInfo1, an object profileInfo2, and an object profileInfo3 are provided in advance so as to be linked with the program area 305-1, the program area 305-2, and the program area 305-3, respectively. Moreover, at the time of the execution of StartProfile (profileInfo1), for example, the number of clock cycles at the time point of execution is saved in the object profileInfo1.

Meanwhile, when calling a method fool which is different from the method foo, measurement is temporarily suspended by a SuspendProfile command shown on line 10. Thereafter, when execution of the method fool is terminated, the measurement is resumed by a ResumeProfile command shown on line 12. To be more precise, the number of clock cycles elapsed from execution of the SuspendProfile command to execution of the ResumeProfile command is saved in the object profileInfo1.

Thereafter, an EndProfile command shown online 15 is executed when execution of the program area 305-3 is terminated. Furthermore, thereafter an EndProfile command shown on line 17 is executed when execution of the program area 305-2 is terminated. Finally, an EndProfile command shown on line 20 is executed when execution of the program area 305-1 is terminated.

The EndProfile command reads the number of clock cycles at a time point of executing the EndProfile command, and calculates a difference from the number of clock cycles saved by the corresponding StartProfile command. Then, the EndProfile command calculates a difference by subtracting the number of clock cycles elapsed from execution of the SuspendProfile command to execution of the ResumeProfile command from the calculated difference. Moreover, the EndProfile command calculates the execution time based on the calculated difference. For example, the EndProfile command may calculate the execution time by dividing the calculated difference by the operating frequency set to the central processing unit 1000.

As a result, the execution time measurement unit 420 can store a measurement result of the execution time of the program area 305-1 in the variable (or the object) profileInfo1, store a measurement result of the execution time of the program area 305-2 in the variable (or the object) profileInfo2, and store a measurement result of the execution time of the program area 305-3 in the variable (or the object) profileInfo3.

Thereafter, the computational capability setting unit 450 generates a command to shift the operating frequency for operating the central processing unit 1000 instead of the StartProfile command, based on a decision result of the optimal operating frequency. That is, for the program area 305-2, the computational capability setting unit 450 generates the command to shift the operating frequency for operating the central processing unit 1000 in an execution position to be executed prior to the relevant program area when the program area is executed. In addition, the computational capability setting unit 450 generates a command to restore the shifted operating frequency instead of the EndProfile command. In this way, when the program area 305-2 is executed once again in the course of executing the execution program 300, it is possible to shift the operating frequency of the central processing unit 1000.

Figure 6:
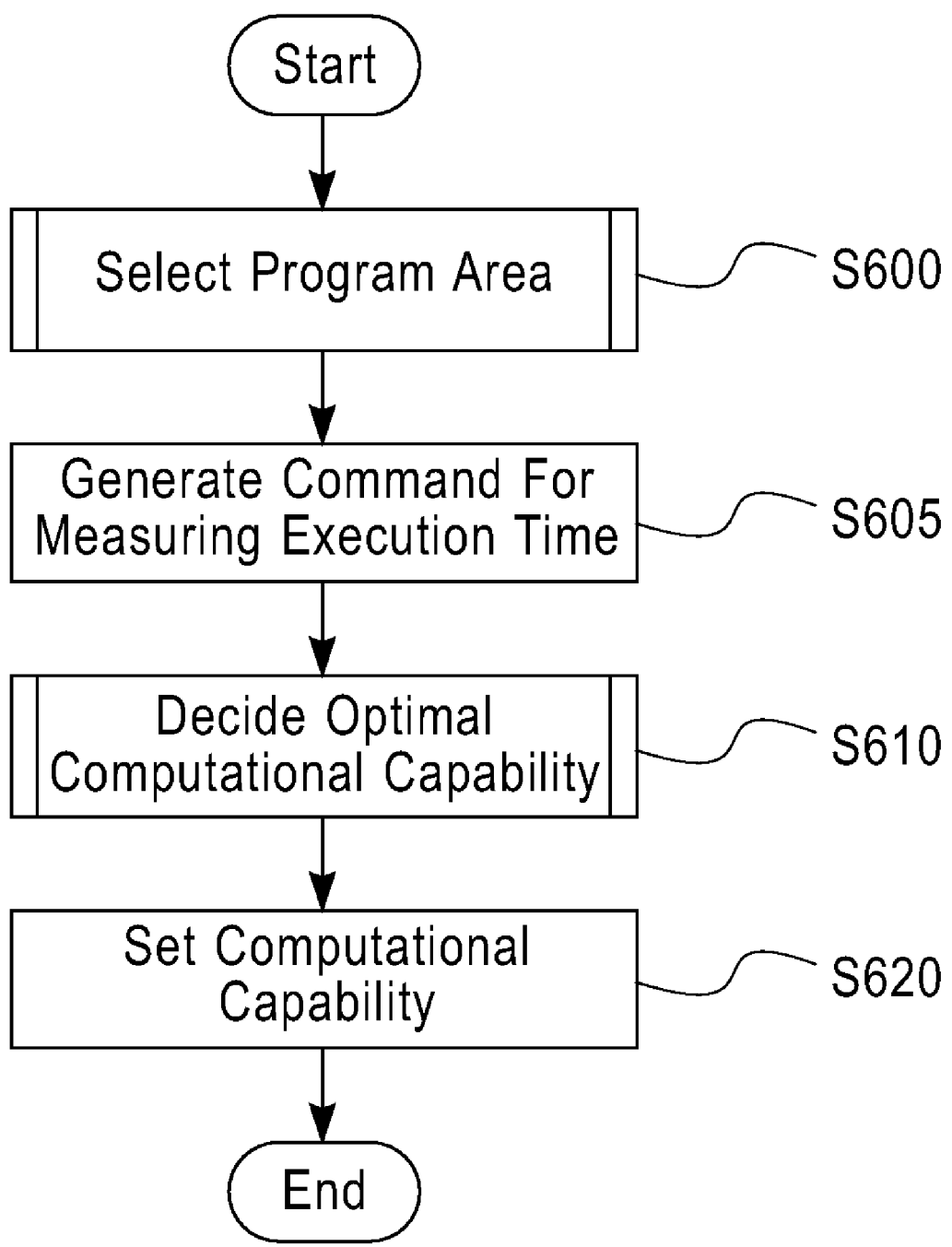
FIG. 6 shows a flow of processing by the compiler 40 for setting a computational capability suitable for the central processing unit 1000.

FIG. 6 shows a flow of processing by the compiler 40 for setting the computational capability suitable for the central processing unit 1000. The program area selection unit 400 selects the program area out of the program areas 305-1 to 305-5 included in the execution program 300, which is executed at a frequency equal to or above the predetermined standard execution frequency (S600). The program area thus selected will be referred to as a profile area. This embodiment will describe each case where each of the program areas 305-1 to 305-3 is selected as the profile area. Next, the execution time measurement unit 420 generates a command for execution time measurement in profile areas in the execution program 300 (S605).

For example, for each of the program areas 305-1 to 305-3, the execution time measurement unit 420 generates the StartProfile command, which is the command to start measurement of the execution time of the relevant program area, in the execution position to be executed at the beginning when execution of the program area is started. Moreover, for each of the program areas 305-1 to 305-3, the execution time measurement unit 420 generates the EndProfile command, which is the command to end the measurement of the execution time of the relevant program area, in the execution position to be executed in the end when the program area is executed. To generate the commands in the program in execution, it is possible to apply either recompilation or dynamic binary rewriting as described previously.

Thereafter, the optimal computational capability decision unit 440 decides the optimal operating frequency, which is the operating frequency to be applied to the central processing unit 1000 during execution of the program area, based on the execution time for each computational capability measured for each of the program areas 305-1 to 305-3 in execution (S610). For each of the program areas 305-1 to 305-3, the computational capability setting unit 450 performs setting so as to execute the relevant program area at the optimal operating frequency thereof when the program area is executed again in the course of executing the execution program 300 (S620).

To be more precise, the computational capability setting unit 450 generates the command to shift the operating frequency in the execution program 300. Here, the computational capability setting unit 450 generates the command to shift the operating frequency in an execution position to be executed between a precedent program area and a subsequent program area on the condition that the program area to be executed earlier and the subsequent program area apply mutually different optimal operating frequencies. That is, when optimal computational capabilities are the same, the computational capability setting unit 450 does not generate the command to shift the operating frequency. In this way, it is possible to prevent a shift of the operating frequency back to the original operating frequency immediately after shifting the operating frequency.

Figure 7:
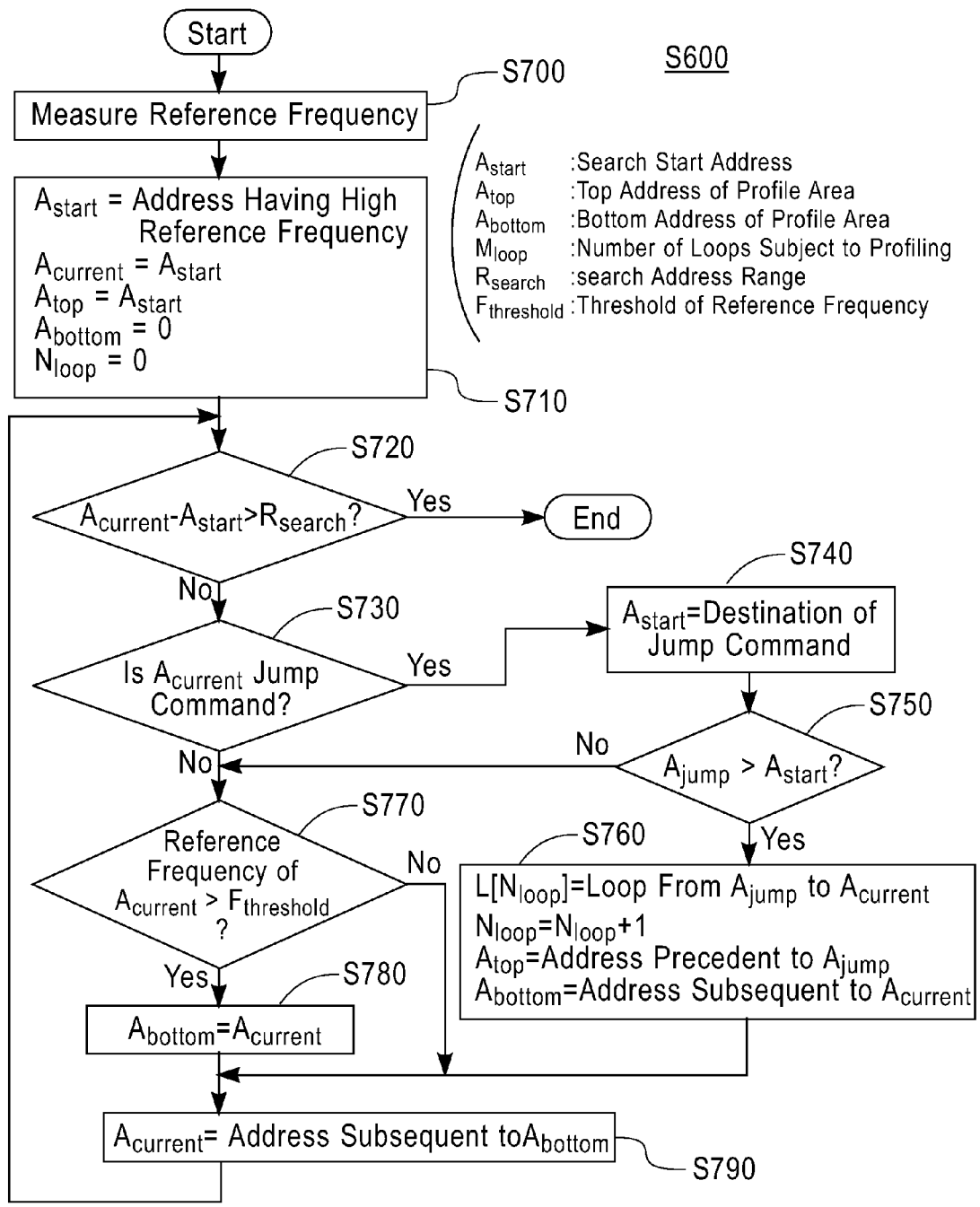
FIG. 7 shows details of an example of processing of S600 in FIG. 6.

FIG. 7 shows details of an example of the processing of S600 in FIG. 6. This drawing describes the processing to determine boundaries of the respective program areas by analyzing the control flow in the execution program 300 when, for example, a boundary of a loop area is unknown in the execution program 300. Firstly, in the course of executing the execution program 300, the reference frequency measurement unit 410 makes reference to the address value of the program counter in the central processing unit 1000 at a predetermined time interval (S700) (see J. Whaley, "A Portable Sampling-Based Profiler for Java Virtual Machines," Java Grande 2000 (hereinafter referred to as "Non-patent Literature 4"), for example).

Next, the program area selection unit 400 assigns the address value of an address, for which the frequency of reference by the reference frequency measurement unit 410 is higher than a predetermined standard value, to a variable $A_{start}$ (S710). Meanwhile, the program area selection unit 400 assigns the value of $A_{start}$ to $A_{top}$ as well as to $A_{current}$. Moreover, the program area selection unit 400 initializes $A_{bottom}$ and $N_{loop}$ to 0. Then, the program area selection unit 400 sequentially follows the execution program 300 in the execution direction from the address $A_{start}$ in accordance with the processing described below, and searches the profile area. Here, $A_{current}$ is a variable for storing an address value in the course of search, and the value thereof is incremented along with progress in the processing.

The program area selection unit 400 judges whether or not $A_{current} - A_{start} > R_{search}$ is satisfied (S720). When $A_{current} - A_{start} > R_{search}$ holds true (S720: YES), the program area selection unit 400 has exceeded a search range for the loop area and therefore terminates the processing. On the contrary, when $A_{current} - A_{start} > R_{search}$ does not hold true (S720: NO), the program area selection unit 400 judges whether or not a jump command such as a conditional/unconditional branch is placed in the address $A_{current}$ (S730).

When a jump command is placed in the address $A_{current}$ (S730: YES), the program area selection unit 400 assigns an address value of a jump destination of the jump command to a variable $A_{jump}$ (S740). Next, the program area selection unit 400 judges whether or not $A_{jump} < A_{start}$ is satisfied (S750). When $A_{jump} < A_{start}$ holds true (S750: YES), a jump direction of the jump command is the reverse of execution sequences. Accordingly, the program area selection unit 400 judges that this jump command forms a loop area (S760). To be more precise, the program area selection unit 400 determined the $N_{loop}$ value as identification information for this loop area, and assigns the start address of the loop area to $A_{top}$ and the end address of the loop area to $A_{bottom}$. Then, the program area selection unit 400 assigns an address subsequent to $A_{current}$ to $A_{current}$ (S790).

Meanwhile, when no jump command is placed in the address $A_{current}$ (S730: NO) or when $A_{jump} < A_{start}$ does not hold true (S750: NO), the following processing will take place. Firstly, the program area selection unit 400 judges whether or not the reference frequency to the address value stored in $A_{current}$ is higher than a threshold $F_{threshold}$ (S770). If the reference frequency is higher than the threshold $F_{threshold}$ (S770: YES), the program area selection unit 400 assigns $A_{current}$ to $A_{bottom}$ (S780), and then goes to processing in S790.

As described above, according to the processing shown in this drawing, it is possible to select the loop area in the execution program 300 or the area having a high execution frequency appropriately as the profile area subject to execution time measurement. In this way, it is possible to insert the command for execution time measurement only to the area presumed to have the high execution frequency even in the case of a program not including information on loop area and the like prepared in advance. Therefore, it is possible to reduce overhead associated with execution time measurement.

Figure 8:
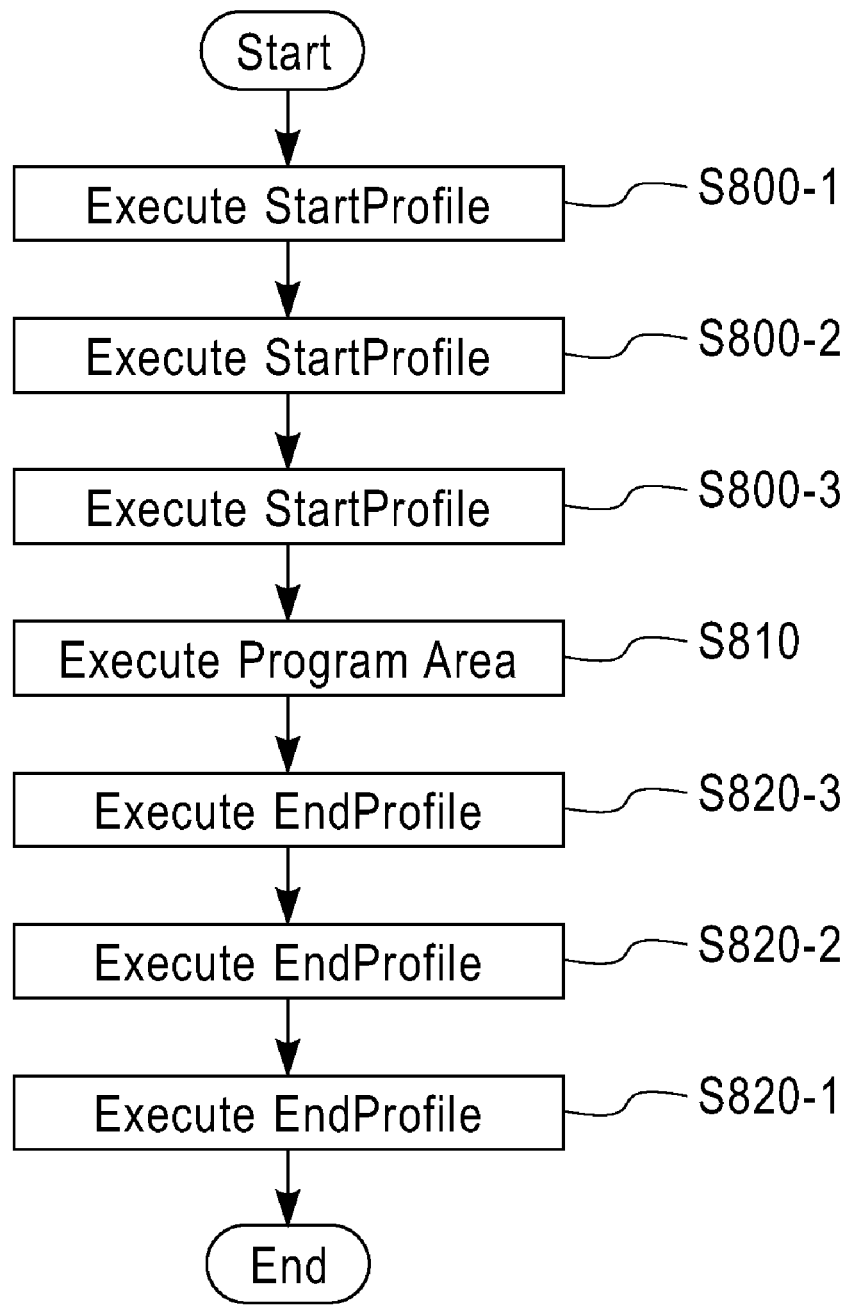
FIG. 8 shows details of processing of S610 in FIG. 6.

FIG. 8 shows details of the processing of S610 in FIG. 6. This drawing corresponds to the program example shown in FIG. 5. The central processing unit 1000 performs the following processing by executing the execution program 300 in which commands are generated by the execution time measurement unit 420. In the execution of a certain program area, the central processing unit 1000 executes the StartProfile command prior to execution of the program area (S800-1).

To be more precise, the execution time measurement unit 420 sets up the operating frequency of the central processing unit 1000 based on a value of a variable P, which is determined so as to correspond to the program area, by executing the StartProfile command. The value of this variable P is sequentially changed by the processing to be described later every time the execution time is measured. Moreover, the execution time measurement unit 420 assigns an execution cycle count of the central processing unit 1000 at a time point of execution of the StartProfile command to a variable $C_{start}$ determined in response to the StartProfile command. Storage areas for these variables are secured in the object profileInfo1 shown in FIG. 5, for example.

Next, the central processing unit 1000 executes the StartProfile command prior to execution of the inner program area (S800-2). Next, the central processing unit 1000 executes the StartProfile command prior to execution of the innermost program area (S800-3).

Next, the central processing unit 1000 executes the innermost program area (S810). When calling a different method in the course of executing this program area, it is preferable to temporarily suspend measurement of the execution time. In this way, it is possible to measure the execution time individually for each method. Thereafter, the central processing unit 1000 executes the EndProfile command when execution of the innermost program area is terminated (S820-3). Next, the central processing unit 1000 executes the EndProfile command corresponding to the StartProfile command in S800-2 (S820-2), and then executes the EndProfile command corresponding to the StartProfile command in S800-1 (S820-1).

Note that this drawing shows only an example of the flow of the processing. In reality, the StartProfile commands and the EndProfile commands are executed along with a flow of the processing of the execution program 300. In other words, the execution time is repeatedly measured by repeatedly executing the same StartProfile command and the same EndProfile command, for example.

Figure 9:
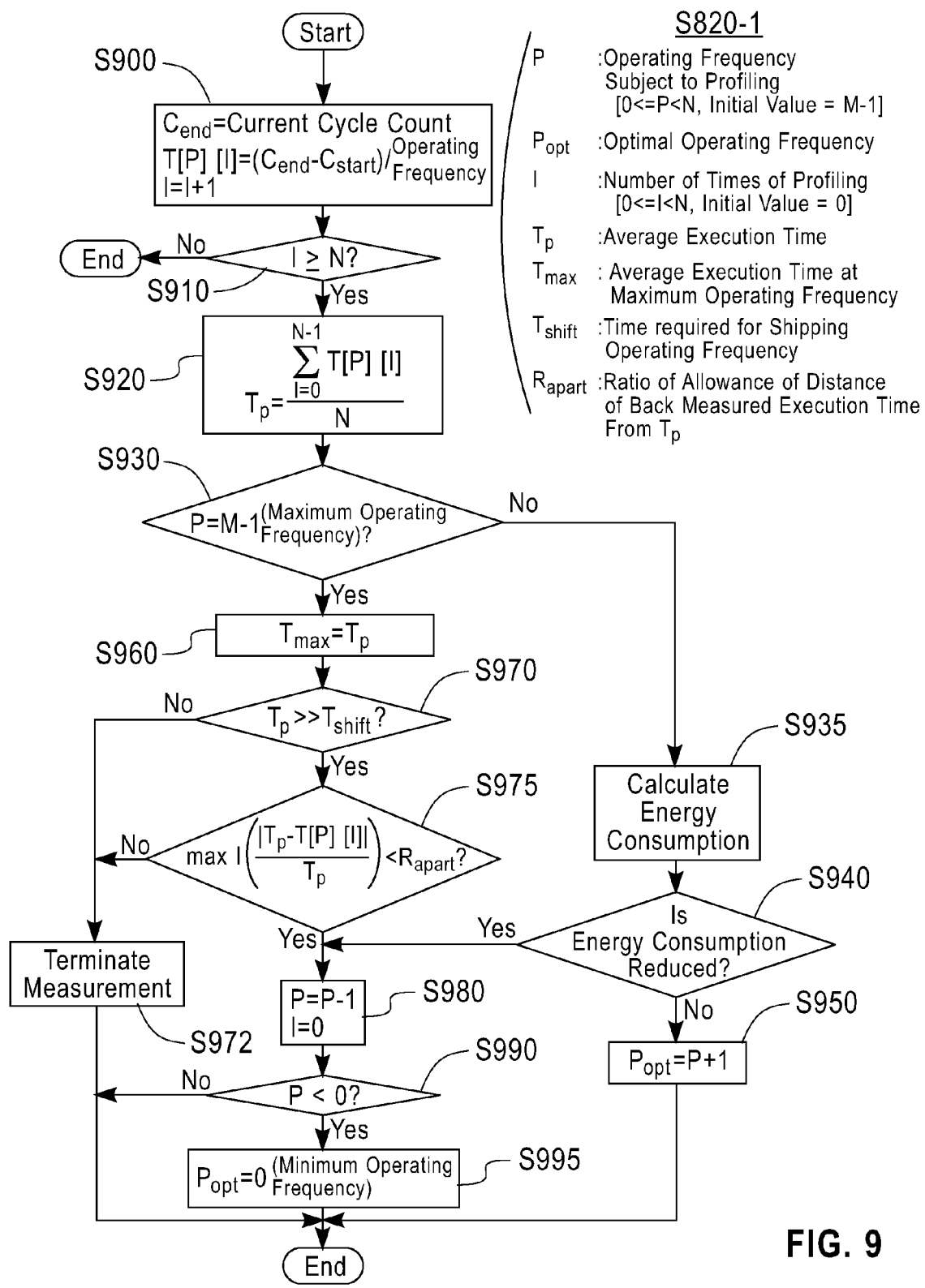
FIG. 9 shows details of processing of S820-1 in FIG. 8.

FIG. 9 shows details of the processing of S820-1 in FIG. 8. The execution time measurement unit 420 causes the central processing unit 1000 to execute the following processing in the course of executing the execution program 300 by generating the EndProfile command. Firstly, the central processing unit 1000 assigns a current execution cycle count of the central processing unit 1000 to a variable $C_{end}$ (S900). Moreover, the central processing unit 1000 obtains the execution time by means of calculating $C_{end}-C_{start}$ and then dividing $C_{end}-C_{start}$ by the operating frequency. Meanwhile, the central processing unit 1000 increments a variable I, which retains the number of measurements of the execution time.

Next, the central processing unit 1000 judges whether or not I≧N holds true (S910). That is, when the number of measurement does not reach a predetermined number N (S910: NO), the processing shown in this drawing is terminated in order to repeat the execution of the program until the number of measurements reaches N times. On the contrary, when the number of measurements reaches the predetermined number N (S910: YES), the central processing unit 1000 calculates an average execution time in the case of executing the same program area at the same operating frequency (S920).

Next, the central processing unit 1000 judges whether or not the currently set operating frequency is equal to a maximum operating frequency (S930). Here, the variable P is assumed to retain a value indicating a predetermined normal operating frequency (i.e. the maximum operating frequency, for example) set up for the central processing unit 1000 as an initial value. When the currently set operating frequency is equal to the maximum operating frequency (S930: YES), the central processing unit 1000 assigns the average value calculated in S920 to a variable $T_{max}$ (S960).

Thereafter, the central processing unit 1000 judges whether or not the average value is extremely greater than time $T_{shift}$ required for shifting the operating frequency (S970). For example, the central processing unit 1000 may judge whether or not the average value is greater than standard time which is predetermined based on the time required for shifting the operating frequency. The standard time is preferably a time period which is greater several times to about ten times than the time required for shifting the operating frequency. Alternatively, the standard time may be equal to the time required for shifting the operating frequency.

When the average value is extremely greater than $T_{shift}$ (S970: YES), the central processing unit 1000 calculates a difference between the average value and the respective execution time measured by executing the same program area at the same operating frequency, and then the central processing unit 1000 obtains a value by means of dividing the difference by the execution time (S975). Thereafter, the central processing unit 1000 obtains a maximum value among the obtained values corresponding to respective measurement attempts. Then, the central processing unit 1000 judges whether or not the maximum value is smaller than a predetermined ratio $R_{apart}$.

When the maximum value is smaller than the ratio $R_{apart}$ (S975: YES), the central processing unit 1000 decrements the variable P and initializes the variable I to 0 (S980). That is, the central processing unit 1000 measures the execution time during subsequent executions while shifting the operating frequency. Thereafter, when the variable P is a negative value (S990: YES) the central processing unit 1000 defines a variable $P_{opt}$ as 0 indicating a minimum operating frequency (S995).

On the contrary, when the average value of the execution time is not extremely greater than $T_{shift}$ (S970: NO) or when the maximum value obtained in S975 is equal to or above the ratio $R_{apart}$ (S975: NO), the central processing unit 1000 sets itself so as not to measure the execution time during subsequent executions of this program area (S972). For example, the execution time measurement unit 420 may delete the StartProfile command and the EndProfile command from the execution program 300. In order to delete the commands, it is possible to apply either recompilation or dynamic binary rewriting as described previously.

That is, as a consequence, when the execution time used for executing this program area by use of a normal computational capability is shorter than the standard time, the execution time measurement unit 420 does not measure the execution time during subsequent executions of the relevant program area. Meanwhile, when variation ranges of the execution time in multiple measurement attempts are greater than a predetermined standard variation range, the execution time measurement unit 420 does not measure the execution time during subsequent executions of the relevant program area. In this way, it is possible to preclude a program area, which is unlikely to achieve an energy consumption reduction effect, from execution time measurement targets and thereby to reduce overhead.

In addition, when this program area is a method, the central processing unit 1000 preferably performs setting so as to terminate measurement of the execution time for loop areas included in the method as well. That is, as a consequence, when the execution time used for executing this method by use of the normal computational capability is shorter than the standard time, the execution time measurement unit 420 does not measure the execution time for executing outer loop areas included in the method as well as inner loop areas included in the outer loop areas. In this way, it is possible to select the targets to be precluded from measurement of the execution time even more efficiently.

Meanwhile, when the currently set operating frequency is not equal to the maximum operating frequency (S930: NO), the energy consumption calculation unit 430 calculates energy consumption in the case of executing the program area at an operating frequency designated by the variable P (S935). Moreover, the optimal computational capability decision unit 440 judges whether or not the energy consumption is reduced from energy consumption which was previously calculated for the program area (S940).

When no decrease is observed, i.e. when the previous energy consumption was smaller (S940: NO), the optimal computational capability decision unit 440 decides the operating frequency used for the previous calculation of the energy consumption for this program area as the optimal operating frequency (S950). That is, P+1 is assigned to the variable $P_{opt}$. On the contrary, when the energy consumption is reduced (S940: YES), the optimal computational capability decision unit 400 allows the processing to proceed to S980 because there may be another operating frequency which can achieve even lower energy consumption.

As shown in S970 in this drawing, for a certain program area, the computational capability setting unit 450 can shift the operating frequency to be applied when the program area is executed again, on the condition that the execution time used by the central processing unit 1000 for executing the program area at the predetermined normal operating frequency is longer than the standard time which has been determined based on the time required for shifting the operating frequency. In this way, it is possible to define only a portion, which is executed for a sufficiently longer period relative to the overhead associated with the shift of the operating frequency, as a target for setting the operating frequency.

In addition, according to the processing shown in S972, when the execution time used for executing the program area at the normal operating frequency is shorter than the standard time, the execution time measurement unit 420 can be set up so as not to measure the execution time during subsequent executions of the program area. In this way, it is possible to further reduce overhead associated with measurement of the execution time.

Moreover, according to the processing shown in S975 of this drawing, when variation ranges of the execution time in multiple measurement attempts at the same operating frequency are greater than the predetermined standard variation range for a certain program area, the computational capability setting unit 450 can execute the relevant program area at the normal operating frequency without shifting the operating frequency. In this way, it is possible to preclude a portion, which has uncertainty about possibility of reduction in the energy consumption, from the target for setting the operating frequency.

The processing in S820-2 and the processing in S820-3 are substantially the same as the processing shown in this drawing. Accordingly, description thereof will be omitted.

FIG. 10 shows an execution result when the compiler 40 compiled and executed a benchmark program. This drawing shows execution time and energy consumption relative to respective operating frequencies for execution of a certain benchmark program, in which the benchmark program was executed at various operating frequencies. The energy consumption is not reduced if the operating frequency is dropped from 1.6 GHz to 1.4 GHz. On the contrary, the energy consumption is drastically reduced despite a slight increase in the execution time when the operating frequency is dropped from 1.2 GHz to 1 GHz.

As described above, according to the information processing device 10 of this embodiment, it is possible to adjust the operating frequency of the central processing unit at high accuracy based on the profile during execution, and thereby to reduce the energy consumption. Moreover, in the case of execution of this benchmark program, the overheads associated with the execution time measurement and the shift of the operating frequency was confirmed to be as small as merely several percent of the entire execution time.

FIG. 11 is a view for explaining functions of the central processing unit 1000 according to a modified example of the embodiment. In this modified example, the central processing unit 1000 executes respective command lines to be respectively executed by a plurality of threads simultaneously and in parallel (see Non-patent Literature 5 and the like, for example). To be more precise, for each of the plurality of threads executed at the same time, the central processing unit 1000 can dynamically change, in the course of executing the program, the number of commands to be allocated to the execution of the thread out of a maximum number of commands which are executable in parallel. For example, a method of allocating the number of commands for executing each thread will be described below in the case of the Simultaneous Multi-Threading (SMT) technique using a Power5 processor of IBM Corporation (registered trademark).

In this technique, it is possible to define priorities of threads for the respective threads which are executed in parallel. The central processing unit 1000 changes the number of decoding slots to be allocated to the respective threads based on differences in priorities among the respective threads. For example, when the difference in priorities is equal to 0 as shown on the third line of the table shown in this drawing, the central processing unit 1000 allocates a half of the decoding slots to each of two threads. Meanwhile, when the difference in priorities is equal to 1, for example, the central processing unit 1000 allocates three-fourths of the decoding slots to one thread and allocates one-fourth of the decoding slots to the other thread. That is, in this technique, a priority of a certain thread shows a ratio of the number of commands to be allocated to the thread out of the total number of commands which are decodable in parallel by the central processing unit 1000.

Now, the modified example of the embodiment will be described using the central processing unit 1000 based on this technique as an example.

Figure 12:
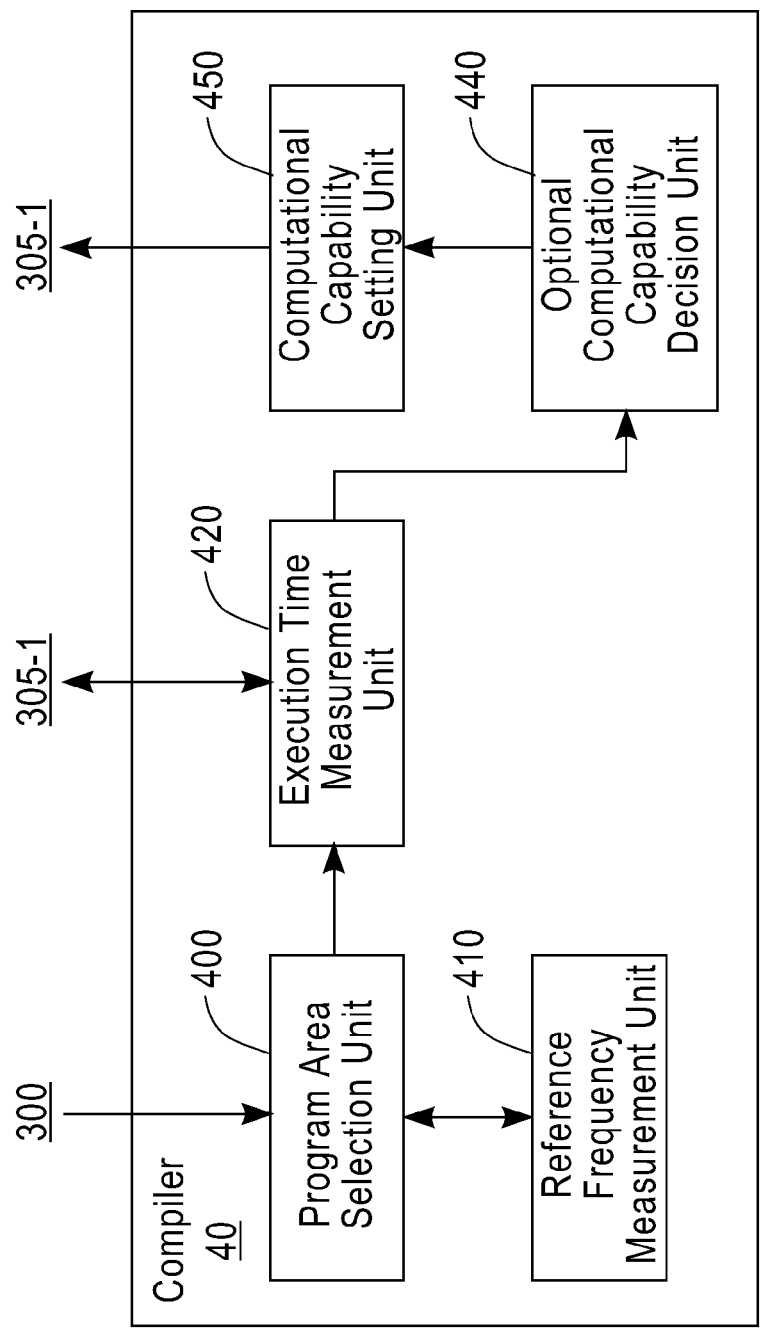
FIG. 12 shows functions of the compiler 40 according to the modified example of the embodiment, which are categorized by functional blocks.

FIG. 12 shows functions of the compiler 40 according to the modified example of the embodiment, which are categorized by functional blocks. In this modified example, the compiler 40 does not have to include the energy consumption calculation unit 430. Moreover, for each of the program areas, the execution time measurement unit 420 measures the execution time used for executing the program area, by use of mutually different thread priorities. Based on the execution time measured for each thread priority, the optimal computational capability decision unit 440 calculates a proportion of an increase in the execution time for execution of the program area at each thread priority relative to execution time for execution of the program area at a maximum thread priority.

Moreover, the optimal computational capability decision unit 440 decides the lowest priority among the priorities having thus calculated proportions which are equal to or below a predetermined standard proportion as an optimal priority. After such decision, the computational capability setting unit 450 generates a command to shift a priority of a thread to execute the relevant program area in an execution position to be executed prior to the program area for execution of each of the program areas.

That is, as shown in this example, the computational capability for executing a certain program area includes not only the operating frequency set up in the course of execution of the program area but also the proportion of the decoding slots to be allocated to the thread to execute the program area. Moreover, this example aims at allocating as many decoding slots as possible to other threads by setting the lowest priority possible on the condition that reduction in execution speed remains in a predetermined range.

Figure 13:
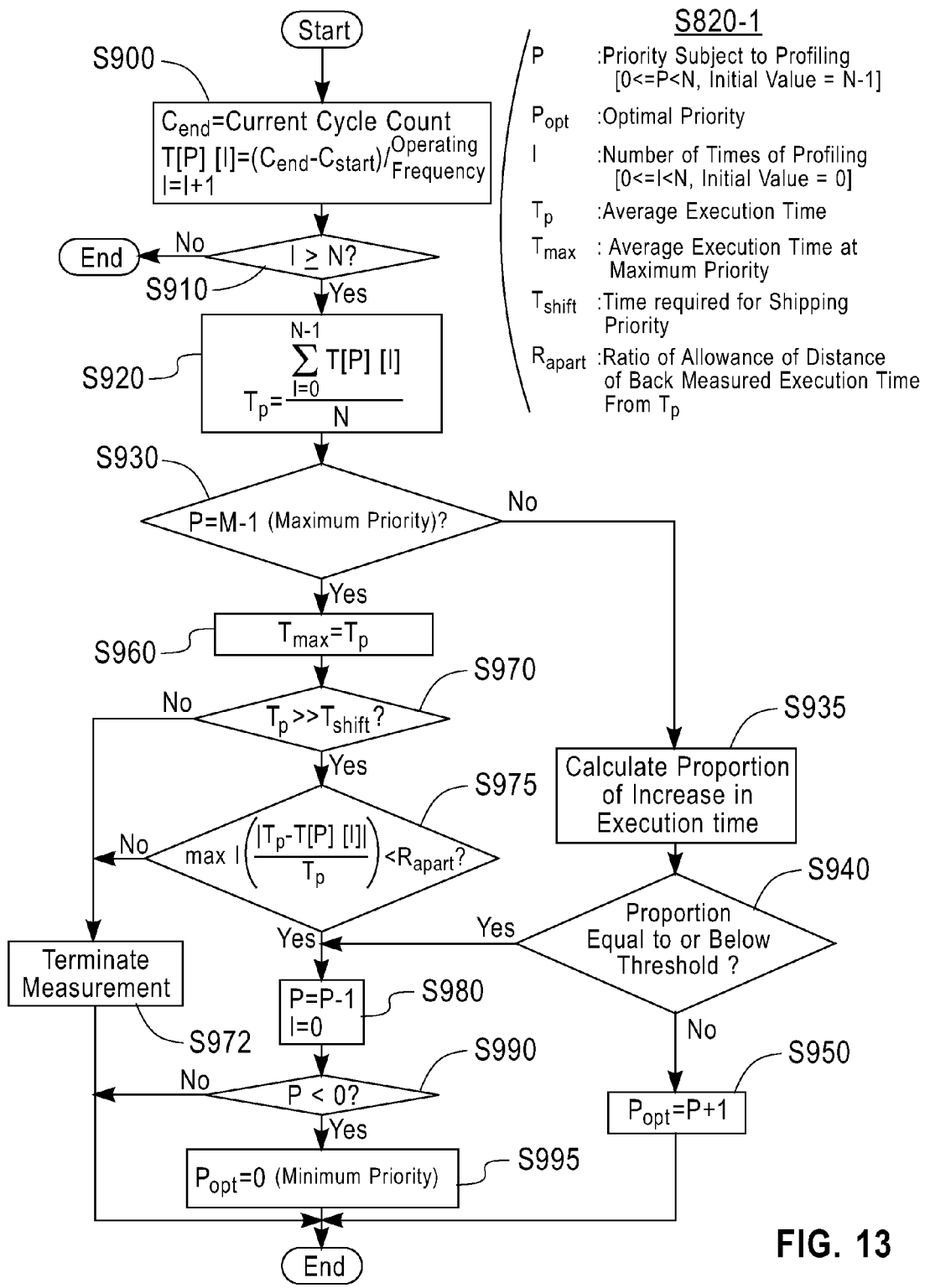
FIG. 13 shows details of processing of S820-1 according to the modified example of the embodiment.

FIG. 13 shows details of the processing of S820-1 according to the modified example of the embodiment. In this example as well, the execution time measurement unit 420 causes the central processing unit 1000 to execute the following processing in the course of executing the execution program 300 by generating the EndProfile commands as in the case of FIG. 9. Firstly, the central processing unit 1000 assigns the current execution cycle count of the central processing unit 1000 to the variable $C_{end}$ (S900). Moreover, the central processing unit 1000 obtains the execution time by means of calculating $C_{end}-C_{start}$ and then dividing $C_{end}-C_{start}$ by the operating frequency. Meanwhile, the central processing unit 1000 increments the variable I, which retains the number of measurements of the execution time.

Next, the central processing unit 1000 judges whether or not I≧N holds true (S910). That is, when the number of measurements does not reach the predetermined number N (S910: NO), the processing shown in this drawing is terminated in order to repeat the execution of the program until the number of measurements reaches N times. On the contrary, when the number of measurements reaches the predetermined number N (S910: YES), the central processing unit 1000 calculates the average value of the execution time in the case of executing the same program area multiple times using the threads having the same priority (S920).

Next, the central processing unit 1000 judges whether or not the priority of the thread in execution is equal to the maximum priority of the settable priorities to the thread (S930). Here, the variable P is assumed to retain a value indicating the maximum priority of the settable priorities to the thread as an initial value. When the priority is equal to the maximum priority (S930: YES), the central processing unit 1000 assigns the average value calculated in S920 to the variable $T_{max}$ (S960).

Thereafter, the central processing unit 1000 judges whether or not the average value is extremely greater than time $T_{shift}$ required for shifting the priority of the thread (S970). For example, the central processing unit 1000 may judge whether or not the average value is greater than standard time which is predetermined based on the time required for shifting the priority. The standard time is preferably a time period which is greater several times to about ten times than the time required for shifting the priority. Alternatively, the standard time may be equal to the time required for shifting the priority.

When the average value is extremely greater than $T_{shift}$ (S970: YES), the central processing unit 1000 calculates a difference between the average value and the respective execution time measured by executing the same program area using the threads having the same priority, and then the central processing unit 1000 obtains a value by means of dividing the difference by the execution time (S975). Thereafter, the central processing unit 1000 obtains a maximum value among the obtained values corresponding to respective measurement attempts. Then, the central processing unit 1000 judges whether or not the maximum value is smaller than the predetermined standard ratio $R_{apart}$.

When the maximum value is smaller than the ratio $R_{apart}$ (S975: YES), the central processing unit 1000 decrements the variable P and initializes the variable I to 0 (S980). That is, the central processing unit 1000 measures the execution time during subsequent executions while shifting the priority of the thread. Thereafter, when the variable P is a negative value (S990: NO) the central processing unit 1000 defines the variable $P_{opt}$ as 0 indicating a minimum priority (S995).

On the contrary, when the average value of the execution time is not extremely greater than $T_{shift}$ (S970: NO) or when the maximum value obtained in S975 is equal to or above the ratio $R_{apart}$ (S975: NO), the central processing unit 1000 sets itself so as not to measure the execution time during subsequent executions of this program area (S972). For example, the execution time measurement unit 420 may delete the StartProfile command and the EndProfile command from the execution program 300. In order to delete the commands, it is possible to apply either recompilation or dynamic binary rewriting as described previously.

That is, as a consequence, when the execution time used for executing this program area by use of the normal computational capability is shorter than the standard time, the execution time measurement unit 420 does not measure the execution time during subsequent executions of the relevant program area. Meanwhile, when variation ranges of the execution time in multiple measurement attempts are greater than a predetermined standard variation range, the execution time measurement unit 420 does not measure the execution time during subsequent executions of the relevant program area. In this way, it is possible to preclude a program area, which is unlikely to achieve an energy consumption reduction effect, from execution time measurement targets and thereby to reduce overhead.

Meanwhile, when the priority currently set to this thread is not equal to the maximum priority (S930: NO), the optimal computational capability decision unit 440 calculates a proportion of an increase in the execution time during execution of the program area at the priority designated by the variable P relative to the execution time during execution of the program area at the maximum priority (S935). Then, the optimal computational capability decision unit 440 judges whether or not the proportion of the increase is equal to or lower than a predetermined threshold (S940).

When the proportion of the increase is not equal to or below the threshold (S940: NO), the optimal computational capability decision unit 440 decides a priority used for previous execution of this program area as the optimal priority (S950). That is, P+1 is assigned to the variable $P_{opt}$, which retains a value indicating the optimal priority. On the contrary, when the proportion of the increase is equal to or below the threshold (S940: YES), the optimal computational capability decision unit 400 allows the processing to proceed to S980 because execution may be possible at an even lower priority.

As described above, in this drawing as well as in the case of FIG. 9, it is possible to define only a portion, which is executed for a sufficiently longer period relative to the overhead associated with a shift in the priority of the thread, as a target for setting the priority of the thread. Moreover, it is possible to preclude a portion, of which a proportion of a reduction in the execution speed is uncertain due to unstable execution time, from the target for setting the priority of the thread. Furthermore, according to this example, it is possible to allocate more decoding slots to other threads on the condition that reduction in the execution speed remains in the predetermined range.

Although the present invention has been described by use of the embodiment, it is to be understood that the technical scope of the present invention will not be limited only to the embodiment. It is obvious to those skilled in the art that various modifications and improvements can be added to the above-described embodiment. It is clear that such modifications and improvements can be also encompassed by the technical scope of the present invention as defined in the appended claims.

Although the preferred embodiment of the present invention has been described in detail, it should be understood that various changes, substitutions and alternations can be made therein without departing from spirit and scope of the inventions as defined by the appended claims.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention. Methods may be implemented as signal methods employing signals to implement one or more steps. Signals include those emanating from the Internet, etc.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

The invention includes a compilation method for setting a computational capability to a central processing unit, the compiler comprising: determining the computational capability based on an execution program to be executed by the central processing unit of which computational capability is rendered variable in the course of execution; changing the computational capability of the central processing unit every time each of a plurality of program areas included in the execution program is executed while the execution program is being executed; measuring the execution time for each of the plurality of program areas; deciding an optimal computational capability, being equivalent to a particular computational capability required to execute a program area using the central processing unit, based on the execution time for each of the computational capabilities measured for respective program areas; and setting the optimal computational capability for executing the program area, to be used on condition of executing the program area again in the course of executing the execution program, for each of the program areas.

In some embodiments, the method further comprising performing setting for each of the program areas for modifying the computational capability of the central processing unit on condition of executing the program area again, on the condition that execution time used for executing the program area at a normal computational capability preset to the central processing unit is longer than standard time which is determined based on time required for modifying the computational capability; and/or refraining from measuring the execution time for subsequent executions of the program area in the course of executing the execution program when the execution time used for executing the program area at the normal computational capability is shorter than the standard time; and/or wherein each of the plurality of program areas is one of: a method included in the execution program, an outer loop area included in the method, and an inner loop area included in the outer loop area, and further comprising refraining from measuring the execution time for execution of the outer loop area included in the method and the inner loop area included in the outer loop area when the execution time used for executing the method at the normal computational capability is shorter than the standard time; and/or further measuring the execution time used for executing each of the program areas multiple times at an identical computational capability, and causing the central processing unit to execute respective program areas at a predetermined normal computational capability when variation ranges of the execution time in multiple measurement attempts are greater than a predetermined standard variation range; and/or the central processing unit increasing power consumption in response to an increase of the computational capability, and decreasing the power consumption when the computational capability is dropped; storing a size of power consumption when the computational capability is set to the central processing unit, for each computational capability set to the central processing unit; calculating energy consumption for executing each of the program areas at each computational capability, for each of the program areas, by multiplying the execution time used for execution at the computational capability by the size of the power consumption stored in the power consumption information storage unit in response to the computational capability, and deciding a computational capability which minimizes the energy consumption calculated by the energy consumption calculation unit, for each of the program areas, as the optimal computational capability for the program area; and/or employing an article of manufacture comprising a computer usable medium having computer readable program code means embodied therein for causing the compilation, the computer readable program code means in said article of manufacture comprising computer readable program code means for causing a computer to effect the steps of: determining; changing; measuring; deciding; and setting.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A compiler for setting a computational capability to a central processing unit, the compiler comprising:
 a processor device configured to perform:
 determining the computational capability based on an execution program to be executed by the central processing unit of which computational capability is rendered variable in the course of execution, said execution time measurement unit for changing the computational capability of the central processing unit every time each of a plurality of program areas included in the execution program is executed while the execution program is being executed, and said execution time measurement unit for measuring the execution time for each of the plurality of program areas;
 deciding an optimal computational capability, which is equivalent to a particular computational capability required to execute a program area using the central processing unit, based on the execution time for each of the computational capabilities measured for respective program areas;
 and setting the optimal computational capability for executing the program area, to be used on condition of executing the program area again in the course of executing the execution program, for each of the program areas; and
 for each of the program areas, modifying the computational capability of the central processing unit on condition of executing the program area again, on the condition that execution time used for executing the program area at a normal computational capability preset to the central processing unit is longer than standard time which is determined based on time required for modifying the computational capability.

2. The compiler according to claim 1, wherein the processor device refrains from measuring the execution time for subsequent executions of the program area in the course of executing the execution program when the execution time used for executing the program area at the normal computational capability is shorter than the standard time.

3. The compiler according to claim 2, wherein:
 each of the plurality of program areas is any of a method included in the execution program, an outer loop area included in the method, and an inner loop area included in the outer loop area, and the processor device refrains from measuring the execution time for execution of the outer loop area included in the method and the inner loop area included in the outer loop area when the execution time used for executing the method at the normal computational capability is shorter than the standard time.

4. The compiler according to claim 1, wherein the processor device further measures the execution time used for executing each of the program areas multiple times at an identical computational capability, and causes the central processing unit to execute the respective program areas at a predetermined normal computational capability when variation ranges of the execution time in multiple measurement attempts are greater than a predetermined standard variation range.

5. The compiler according to claim 1, wherein the central processing unit increases power consumption in response to an increase of the computational capability, and decreases the power consumption when the computational capability is dropped, the compiler further comprises:
 a power consumption information storage unit for storing a size of power consumption when the computational capability is set to the central processing unit, for each computational capability set to the central processing unit; and
 an energy consumption calculation unit for calculating energy consumption for executing each of the program areas at each computational capability, for each of the program areas, by multiplying the execution time used for execution at the computational capability by the size of the power consumption stored in the power consumption information storage unit in response to the computational capability, and the optimal computational capability decision unit decides a computational capability which minimizes the energy consumption calculated by the energy consumption calculation unit, for each of the program areas, as the optimal computational capability for the program area.

6. The compiler according to claim 1, wherein the central processing unit executes respective commands in a plurality of threads in parallel, and wherein the processor device, on condition of executing each of the program areas, generates a command to shift a ratio of the number of commands to be allocated to the thread to execute the program area out of a number of commands decodable in parallel by the central processing unit, in an execution position to be executed prior to the program area.

7. The compiler according to claim 1, wherein the processor device, on condition of executing each of the program areas, generates a command to shift an operating frequency for operating the central processing unit in an execution position to be executed prior to the program area.

8. The compiler according to claim 1, further comprising:
a program area selection unit for selecting a program area to be executed at a frequency equal to or above a predetermined standard execution frequency among a plurality of program areas included in the execution program, wherein the execution time measurement unit measures the execution time of the program area for each of the program areas selected by the program area selection unit.

9. The compiler according to claim 1, wherein the processor device further generates a command to modify the computational capability in an execution position to be executed between a precedent program area and a subsequent program area on the condition that the precedent program area and the subsequent program area apply mutually different optimal computational capabilities, and the unit does not generate a command to modify the computational capability on the condition that the optimal computational capabilities are identical.

10. The compiler according to claim 1, wherein the computational capability setting unit performs setting for each of the program areas for modifying the computational capability of the central processing unit on condition of executing the program area again, on the condition that execution time used for executing the program area at a normal computational capability preset to the central processing unit is longer than standard time which is determined based on time required for modifying the computational capability;
wherein the execution time measurement unit refrains from measuring the execution time for subsequent executions of the program area in the course of executing the execution program when the execution time used for executing the program area at the normal computational capability is shorter than the standard time;
wherein each of the plurality of program areas is any of a method included in the execution program, an outer loop area included in the method, and an inner loop area included in the outer loop area, and the execution time measurement unit refrains from measuring the execution time for execution of the outer loop area included in the method and the inner loop area included in the outer loop area when the execution time used for executing the method at the normal computational capability is shorter than the standard time;
wherein the execution time measurement unit further measures the execution time used for executing each of the program areas multiple times at an identical computational capability, and wherein the computational capability setting unit causes the central processing unit to execute the respective program areas at a predetermined normal computational capability when variation ranges of the execution time in multiple measurement attempts are greater than a predetermined standard variation range;
wherein the central processing unit increases power consumption in response to an increase of the computational capability, and decreases the power consumption when the computational capability is dropped, and the compiler further comprises:

a power consumption information storage unit for storing a size of power consumption when the computational capability is set to the central processing unit, for each computational capability set to the central processing unit; and an energy consumption calculation unit for calculating energy consumption for executing each of the program areas at each computational capability, for each of the program areas, by multiplying the execution time used for execution at the computational capability by the size of the power consumption stored in the power consumption information storage unit in response to the computational capability, and the optimal computational capability decision unit decides a computational capability which minimizes the energy consumption calculated by the energy consumption calculation unit, for each of the program areas, as the optimal computational capability for the program area;
wherein the central processing unit executes respective commands in a plurality of threads in parallel, and wherein the computational capability setting unit, on condition of executing each of the program areas, generates a command to shift a ratio of the number of commands to be allocated to the thread to execute the program area out of a number of commands decodable in parallel by the central processing unit, in an execution position to be executed prior to the program area;
wherein the computational capability setting unit, on condition of executing each of the program areas, generates a command to shift an operating frequency for operating the central processing unit in an execution position to be executed prior to the program area;
further comprising:
a program area selection unit for selecting a program area to be executed at a frequency equal to or above a predetermined standard execution frequency among a plurality of program areas included in the execution program, wherein the execution time measurement unit measures the execution time of the program area for each of the program areas selected by the program area selection unit.

11. An information processing device for setting a computational capability to a central processing unit, the computational capability determined based on an execution program to be executed by the central processing unit of which computational capability is rendered variable in the course of execution, the information processing device comprising:
a processor device configured to perform:
changing a computational capability of the central processing unit every time each of a plurality of program areas included in the execution program is executed while the execution program is being executed and for measuring the execution time for each of the plurality of program areas;
deciding an optimal computational capability, which is equivalent to a computational capability required to execute the program area using the central processing unit, based on the execution time for each of the computational capabilities measured for the respective program areas;
performing setting of the optimal computational capability for executing the program area, which is to be used on condition of executing the program area again in the course of executing the execution program, for each of the program areas; and
for each of the program areas, modifying the computational capability of the central processing unit on condition of executing the program area again, on the condition that execution time used for executing the program area at a normal computational capability preset to the central processing unit is longer than standard time which is determined based on time required for modifying the computational capability.

12. An information processing device encoding a compiler program for causing the information processing device to function as a compiler for setting a computational capability to a central processing unit, the computational capability determined based on an execution program to be executed by the central processing unit of which computational capability is rendered variable in the course of execution, the compiler program causing the information processing device to perform:

changing a computational capability of the central processing unit every time each of a plurality of program areas included in the execution program is executed while the execution program is being executed and for measuring the execution time for each of the plurality of program areas;

an optimal computational capability, which is equivalent to a computational capability required to execute the program area using the central processing unit, based on the execution time for each of the computational capabilities measured for the respective program areas;

performing setting of the optimal computational capability to the execution program after compilation for executing the program area, which is to be used on condition of executing the program area again in the course of executing the execution program, for each of the program areas; and for each of the program areas, modifying the computational capability of the central processing unit on condition of executing the program area again, on the condition that execution time used for executing the program area at a normal computational capability preset to the central processing unit is longer than standard time which is determined based on time required for modifying the computational capability.

13. A compilation method for setting a computational capability to a central processing unit, comprising:

using a processor device configured to perform:
determining the computational capability based on an execution program to be executed by the central processing unit of which computational capability is rendered variable in the course of execution;
changing the computational capability of the central processing unit every time each of a plurality of program areas included in the execution program is executed while the execution program is being executed;
measuring the execution time for each of the plurality of program areas;
deciding an optimal computational capability, being equivalent to a particular computational capability required to execute a program area using the central processing unit, based on the execution time for each of the computational capabilities measured for respective program areas;
setting the optimal computational capability for executing the program area, to be used on condition of executing the program area again in the course of executing the execution program, for each of the program areas and
for each of the program areas, modifying the computational capability of the central processing unit on condition of executing the program area again, on the condition that execution time used for executing the program area at a normal computational capability preset to the central processing unit is longer than standard time which is determined based on time required for modifying the computational capability.

14. A compilation method according to claim 13, further comprising refraining from measuring the execution time for subsequent executions of the program area in the course of executing the execution program when the execution time used for executing the program area at the normal computational capability is shorter than the standard time.

15. A compilation method according to claim 14, wherein each of the plurality of program areas is one of:
a method included in the execution program, an outer loop area included in the method, and an inner loop area included in the outer loop area, and further comprising refraining from measuring the execution time for execution of the outer loop area included in the method and the inner loop area included in the outer loop area when the execution time used for executing the method at the normal computational capability is shorter than the standard time.

16. A compilation method according to claim 13, further comprising further measuring the execution time used for executing each of the program areas multiple times at an identical computational capability, and causing the central processing unit to execute respective program areas at a predetermined normal computational capability when variation ranges of the execution time in multiple measurement attempts are greater than a predetermined standard variation range.

17. A compilation method according to claim 13, further comprising the central processing unit increasing power consumption in response to an increase of the computational capability, and decreasing the power consumption when the computational capability is dropped;
storing a size of power consumption when the computational capability is set to the central processing unit, for each computational capability set to the central processing unit;
calculating energy consumption for executing each of the program areas at each computational capability, for each of the program areas, by multiplying the execution time used for execution at the computational capability by the size of the power consumption stored in the power consumption information storage unit in response to the computational capability, and deciding a computational capability which minimizes the energy consumption calculated by the energy consumption calculation unit, for each of the program areas, as the optimal computational capability for the program area.

18. A compilation method according to claim 13, further comprising employing an article of manufacture comprising a computer usable medium having computer readable program code means embodied therein for causing the compilation, the computer readable program code means in said article of manufacture comprising computer readable program code means for causing a computer to effect the steps of:
determining;
changing;
measuring;
deciding; and
setting.

* * * * *